(12) United States Patent
Marshall et al.

(10) Patent No.: US 8,161,207 B1
(45) Date of Patent: Apr. 17, 2012

(54) COMMON BLOCK INTERFACE FOR DATA AND CONTROL WITH HANDSHAKE PROTOCOL

(75) Inventors: John D. Marshall, Meridian, ID (US); Douglas G. Keithley, Boise, ID (US); Gregory R. Smith, Saratoga, CA (US); Roy G. Moss, Palo Alto, CA (US)

(73) Assignee: Marvell International Ltd. (BM)

( * ) Notice: Subject to any disclaimer, the term of this patent is extended or adjusted under 35 U.S.C. 154(b) by 1109 days.

(21) Appl. No.: 11/801,845

(22) Filed: May 11, 2007

Related U.S. Application Data

(60) Provisional application No. 60/815,771, filed on Jun. 22, 2006.

(51) Int. Cl.
| | |
|---|---|
| *G06F 3/00* | (2006.01) |
| *G06F 13/12* | (2006.01) |
| *G06F 13/38* | (2006.01) |
| *G06F 13/00* | (2006.01) |

(52) U.S. Cl. .......................... 710/36; 710/62; 710/107
(58) Field of Classification Search .................. 710/62, 710/36, 107
See application file for complete search history.

(56) References Cited

U.S. PATENT DOCUMENTS

| 5,497,153 | A  | * | 3/1996  | Jeong ........................ 341/67 |
|-----------|----|---|---------|--------------------------------------|
| 7,496,618 | B2 | * | 2/2009  | Brown et al. ................ 708/404 |
| 2003/0140301 | A1 | * | 7/2003  | Litwin et al. ................ 714/784 |
| 2004/0257468 | A1 | * | 12/2004 | Filliman ........................ 348/488 |

FOREIGN PATENT DOCUMENTS

WO    WO 2004063836 A2 * 7/2004

* cited by examiner

*Primary Examiner* — Chun-Kuan Lee
*Assistant Examiner* — Farley Abad

(57) ABSTRACT

A method and apparatus for handshaking using a 2-wire protocol is described. An electronic component may be divided into blocks, with the blocks performing one or more functions. The blocks may be in series with one another to form a pipeline. The blocks may use interface circuitry to transfer information upstream from or downstream to another block. The interface circuitry uses the 2-wire handshaking for the transfer including a transmit readiness wire configured to carry a signal indicative of readiness of the upstream circuit to output data and a receive readiness wire configured to carry a signal indicative of readiness of the downstream circuit to receive the data.

42 Claims, 13 Drawing Sheets

COMMON BLOCK INTERFACE FOR DATA AND CONTROL WITH HANDSHAKE PROTOCOL

CROSS-REFERENCE TO RELATED APPLICATION

This application claims the benefit of U.S. Provisional Application No. 60/815,771, filed Jun. 22, 2006, the entirety of which is hereby incorporated by reference.

BACKGROUND

An electronic component may perform one or more functions. For example, a microprocessor may perform arithmetic, logic, and control functions. As another example, a scanner may input the raw scanned data, normalize the raw scanned data, exclude data outside of the margins, and perform color correction. The electronic component may be divided into blocks, with each block performing one or more of the functions of the electronic component. For example, the microprocessor may be divided into blocks comprising an arithmetic block, a logic block, and a control block.

When divided into blocks, the blocks may interface with one another, allowing for the transfer of information from one block to another. One method to interface blocks is to use the main memory of the electronic component. Specifically, the main memory may act as a buffer between blocks, with one block transferring information to the main memory, and a second block accessing the transferred information from the main memory. This process allows for minimal storage inside the individual blocks, and allows for the main memory to handle the protocol interfacing between the blocks. However, using main memory to transfer information between blocks is typically large, complex, and expensive. It may also add latency and reduce throughput of the electronic component if all information must be handled by the main memory.

Another method for block interfacing uses bus structures with complex protocols. The bus structures enable the direct transfer of information from one block to another, typically using industry standards. However, the bus structures tend to be very complex, implementing a superset of interface requirements.

Still another method for block interfacing uses interfacing that is customized for specific blocks. This customized interfacing is simpler than industry-standard bus structures. However, the customized interfacing typically handles data and control information that is transferred between blocks separately. Specifically, the customized interfacing may use two separate busses, one to transfer the control information and a second to transfer the data information. Further, the customized interfacing may be difficult to apply generally without unduly customizing the interface. Accordingly, it would be advantageous to transfer data and control information between blocks in a simple and common manner.

SUMMARY

The present invention is defined by the attached claims, and nothing in this section should be taken as a limitation on those claims. In order to address the need discussed above, described below is a system and method for transferring data using a handshaking protocol.

According to one aspect, an electronic component includes a plurality of logic components. The logic components may perform one or more functions and may communicate with one another in series to form a pipeline. Each logic component may have interface circuitry associated therewith, including an upstream interface circuit for interfacing with and receiving data from an upstream logic component and a downstream interface circuit for interfacing with and transferring data to a downstream logic component. The data may include any control data or information data.

The upstream interface circuit may include an input signal path configured to receive the data from the upstream logic component, an upstream transmit readiness signal path configured to receive an upstream transmit readiness signal from the upstream logic component, and an upstream receive readiness signal path configured to transmit an upstream receive readiness signal to the upstream logic component. The input signal path may include N lines input to a buffer. The upstream transmit readiness signal may be indicative of the readiness of the upstream logic component to transmit data, and the upstream receive readiness signal may be indicative of the readiness of the associated logic component to receive data (such as readiness in the current clock cycle or readiness in the next clock cycle to receive data).

The downstream interface circuit may include an output signal path configured to output data from the associated logic component to the downstream logic component, a downstream transmit readiness signal path configured to transmit a downstream transmit readiness signal to the downstream logic component, and a downstream receive readiness signal path configured to receive a downstream receive readiness signal from the downstream logic component. The downstream transmit readiness signal may be indicative of the readiness of the associated logic component to output data (such as readiness in the current clock cycle or readiness in the next clock cycle to output data), and the downstream receive readiness signal may be indicative of the readiness of the downstream logic component to receive data.

A method for transferring data in an electronic component having a plurality of logic components is also recited. The method for transferring data to and from each of the logic components includes receiving an upstream transmit readiness signal from an upstream logic component and transmitting an upstream receive readiness signal to the upstream logic component. The upstream transmit readiness signal may be indicative of the readiness of the upstream logic component to transmit data. The upstream receive readiness signal may be indicative of the associated logic component to receive data. When the upstream transmit readiness signal is indicative of readiness of the upstream logic component to transmit the data and when the upstream receive readiness signal is indicative of readiness of the associated logic component to receive the data, data is transferred to the associated logic component. Similarly, transferring data from the logic component may include transmitting a downstream transmit readiness signal to a downstream logic component and receiving a downstream receive readiness signal from the downstream logic component. When the downstream transmit readiness signal is indicative of readiness of the associated logic component to output the data and when the downstream receive readiness signal is indicative of readiness of the downstream logic component to receive the data, the data is output from the logic component.

The following description will now be described with reference to the attached drawings.

DETAILED DESCRIPTION

Figure 1:
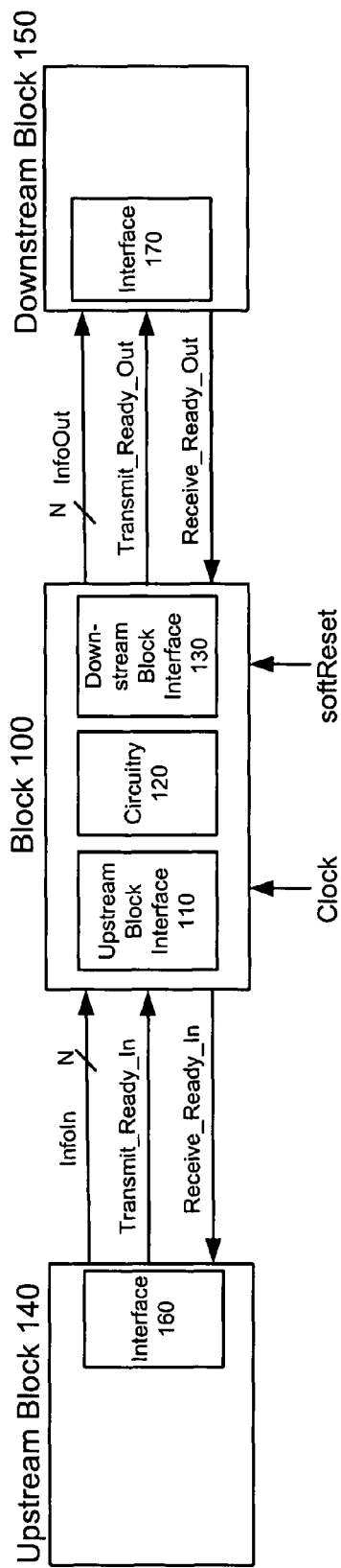
FIG. 1 is a diagram of blocks in an electronic component.
Figure 8A:
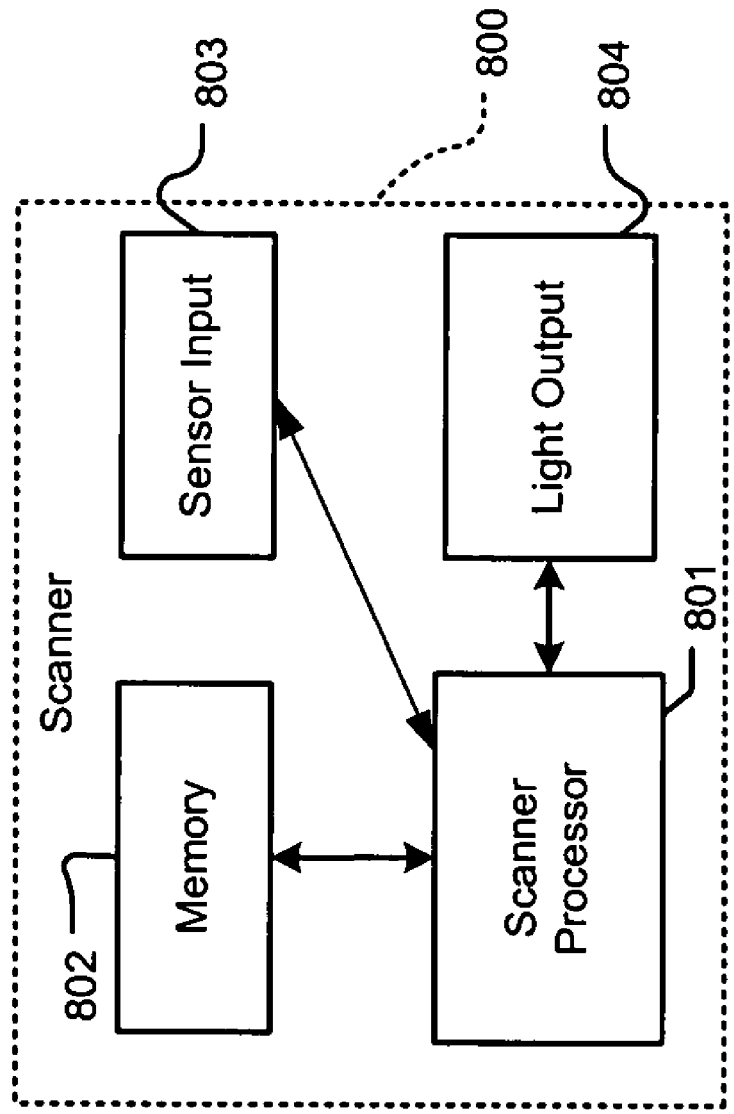
FIG. 8A is a functional block diagram of a scanner.

An embodiment illustrating the signals input to and output from block 100 is shown in FIG. 1. The block 100 may include circuitry 120 to perform one or more functions for an electronic component. For example, the block 100 may be one of several blocks in a scanner, and may include circuitry 120 for performing one or more functions, such as normalizing the scan data, excluding data outside of the margins, or performing color correction, as illustrated in FIG. 8A. As another example, the block 100 may be one of several blocks in a multi-function printer (such as a multi-function printer that faxes, scans and prints). As still another example, the block 100 may be one of several blocks in a hard disk drive, digital versatile disk (DVD), high definition television, vehicle control system, cellular phone, set top box, or media player, as illustrated in FIGS. 8B-8H.

As depicted in FIG. 1, the block 100 may be one block in a series of blocks, including upstream block 140 and downstream block 150, which form a pipeline. Each block in the series may input data and/or control information, perform a function, and output data and/or control information. For example, block 140 may perform the function of normalizing the scan data, block 100 may perform the function of excluding data outside of the margins, and downstream block 150 may perform the function of performing color correction. Alternatively, multiple blocks may perform a single function. For example, upstream block 140, block 100, and downstream block 150 may perform the single function of normalizing the scan data. The block 100 may include an upstream block interface 110 and a downstream block interface 130.

The upstream block interface 110 may include circuitry in order to input data and/or control information to block 100. As depicted in FIG. 1, N lines (designated as InfoIn) may be input to block 100. N may be any integer number. Further, the information input on the InfoIn lines may be data information, control information, or a combination of data and control information. The InfoIn lines may include lines that are dedicated to inputting data and lines that are dedicated to inputting control information. For example, the InfoIn lines may include 32 lines, with 16 lines inputting data information and 16 lines inputting control information. In this manner, the InfoIn lines may input 32 bits of data and control information. The InfoIn lines may alternatively include lines that transfer both data and control information. For example, one or more of the InfoIn lines may alternate between transferring data information and transferring control information.

As further depicted in FIG. 1, a signal on a Transmit_Ready_In line may be generated by the upstream block 140 and input to the block 100. Specifically, the interface 160 may generate a signal on the Transmit_Ready_In line that is indicative of the readiness of the upstream block 140 to transfer information to the block 100 using the InfoIn lines. The signal on the Transmit_Ready_In line may be logic HIGH to indicate that the upstream block 140 is ready to transfer information. As discussed in more detail below, the interface 160 may be identical to the downstream block interface 130.

The block 100 may further generate a signal on a Receive_Ready_In line and output the signal to the upstream block 140. Specifically, the upstream block interface 110 may generate a signal on the Receive_Ready_In line that is indicative of the readiness of the block 100 to receive information from the upstream block 140 using the InfoIn lines. Similar to the signal on the Transmit_Ready_In line, the signal on the Receive_Ready_In line may be logic HIGH to indicate that the block 100 is ready to receive information.

The data and/or control information may be transferred using the InfoIn lines when both the Transmit_Ready_In line and the Receive_Ready_In line include signals that are indicative of readiness of the upstream block 140 and the block 100 to transfer and receive information, respectively. In this manner, data and/or control information may be transferred using one handshake protocol (with the Transmit_Ready_In line and the Receive_Ready_In line), thereby reducing the signals between the block 100 and the upstream block 140 required to transfer information.

The downstream block interface 130 may include circuitry in order to output data and/or control information from the block 100. As depicted in FIG. 1, N lines (designated as InfoOut) may be output from the block 100. As discussed above, N may be any integer number. Further, as shown in FIG. 1, the number of lines for InfoIn may be the same number of lines for InfoOut. Alternatively, the number of lines for InfoIn may be different from the number of lines for InfoOut. Similar to the InfoIn lines, the InfoOut lines may output data information, control information, or a combination of data and control information.

As further depicted in FIG. 1, a signal on a Transmit_Ready_Out line may be generated by the block 100 and output to the downstream block 150. Specifically, the downstream block interface 130 may generate a signal on the Transmit_Ready_Out line that is indicative of the readiness of the block 100 to transfer information to the downstream block 150 using the InfoOut lines. The signal on the Transmit_Ready_Out line may be logic HIGH to indicate that the block 100 is ready to transfer information.

The downstream block 150 may further generate a signal on a Receive_Ready_Out line and input the signal to the block 100. Specifically, the interface 170 may generate a signal on the Receive_Ready_Out line that is indicative of the readiness of the downstream block 150 to receive information from the block 100 using the InfoOut lines. The signal on the Receive_Ready_Out line may be logic HIGH to indicate that the downstream block 150 is ready to receive information.

As discussed in more detail below, the data and/or control information may be transferred using the InfoOut lines when both the Transmit_Ready_Out line and the Receive_Ready_Out line include signals that are indicative of readiness of the block 100 and the downstream block 150 to transfer and receive information, respectively. In this manner, data and/or control information may be transferred using one handshake protocol (with the Transmit_Ready_Out line and the Receive_Ready_Out line), thereby reducing the signals between block 100 and downstream block 150 required to transfer information.

As further depicted in FIG. 1, a Clock line may be input to block 100. The Clock line may include a clock signal, or other oscillating signal, for use by the block 100. The Clock line may be used to synchronize the transfer of data and/or control information. For example, the transfer of information from the upstream block 140 to the block 100 may occur, after the signals Transmit_Ready_In and Receive_Ready_In go HIGH, at the next edge of the Clock line. As another example, the transfer of information from the block 100 to the downstream block 150 may occur, after the signals Transmit_Ready_Out and Receive_Ready_Out go HIGH, at the next edge of the Clock line. The Clock line may further be input to one, some, or all of the blocks in an electronic component, such as the upstream block 140 and the downstream block 150. Alternatively, the Clock line to the upstream block 140 and/or the downstream block 150 may be different from the Clock line input to the block 100.

A softReset line may also be input to block 100. A signal on the softReset line may be used to indicate a reset of the upstream block interface 110 and/or the downstream block interface 130 to a known state. For example, a HIGH signal on the softReset line may force the downstream block interface 130 into a reset state. As discussed in more detail below, the reset state may include LOW values for the signal on the Transmit_Ready_Out line, the signal on the Receive_Ready_In line, and LOW values in the buffers 202, 302 (from FIGS. 2 and 3) within the upstream block interface 110 and/or the downstream block interface 130. Once the signal on the softReset line goes LOW, for example, the block 100 may resume normal operation. One, some, or all of the blocks in a pipeline may include the inputs and outputs as described for block 100.

The designation of various elements in FIG. 1 is merely for illustrative purposes. For example, element 140 designated as the "upstream" block and element 150 designated as the "downstream" block illustrate the transfer of information to and from the block 100. Similarly, the designation of "InfoIn" and "InfoOut" illustrate the flow of information in and out of block 100. Moreover, the Transmit_Ready_In line and the Receive_Ready_In line include the designation "In" to indicate that the signals relate to the input of information to block 100. Similarly, the Transmit_Ready_Out line and the Receive_Ready_Out line include the designation "Out" to indicate that the signals relate to the output of information from block 100.

The interfaces used in the various blocks of an electronic component may be common to one another. For example, the interface 160 used by the upstream block 140 to transfer information to the block 100 may be identical to the downstream block interface 130 used by the block 100 to transfer information to the downstream block 150. Similarly, the interface 170 used by the downstream block 150 to receive information from the block 100 may be identical to the upstream block interface 110 used by the block 100 to receive information from the upstream block 140. In this manner, the interfaces used in the various blocks of an electronic component may be common, such as having a common upstream block interface 110 and a common downstream block interface 130. Further, the handshaking signals used between the various blocks may also be common. As shown in FIG. 1, the handshaking signals are designated as Transmit_Ready_In, Receive_Ready_In, Transmit_Ready_Out, and Receive_Ready_Out for purposes of illustration. Using common interfaces, the signals on the Transmit_Ready_In line may be the same as the signals for the Transmit_Ready_Out line (with both indicating transmit readiness for an upstream block), and the signals on the Receive_Ready_In line may be the same as the signals for the Receive_Ready_Out line (with both indicating receive readiness for a downstream block). Further, any type of circuitry 120 may be used in block 100. For example, the circuitry 120 in the block 100 may perform functions for the electronic component or may perform testing of one or both of the upstream block 140 or the downstream block 150.

Figure 2:
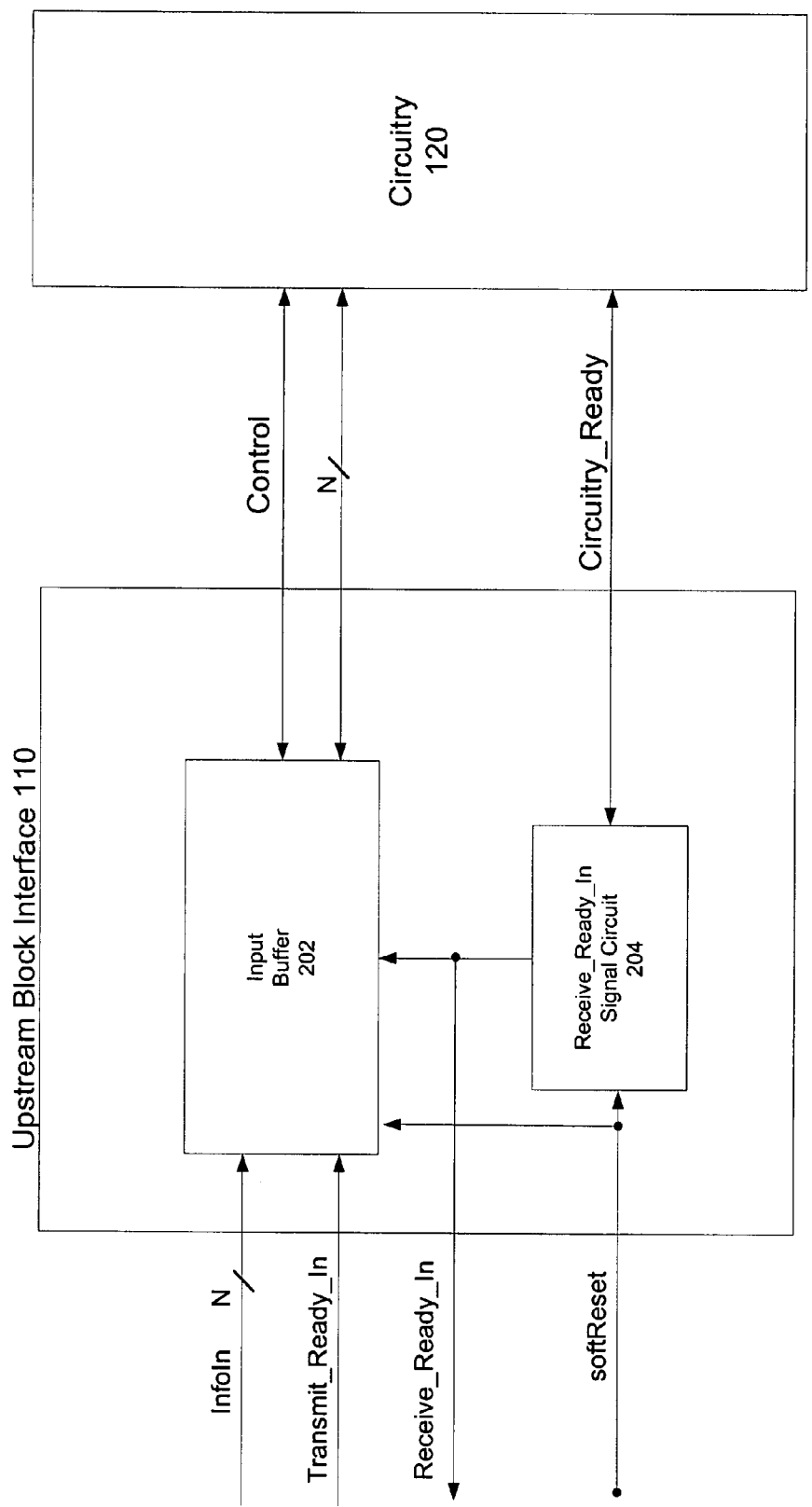
FIG. 2 is a block diagram of the upstream block interface as shown in FIG. 1.

An embodiment of the upstream block interface 110 is illustrated in FIG. 2. The upstream block interface 110 may include an input buffer 202 that buffers the information input from InfoIn. The input buffer 202 may comprise one or more registers for buffering the information input from InfoIn. For example, if InfoIn comprises 32 lines, the input buffer 202 may comprise a single 32-bit register (for an input buffer 202 that buffers one cycle of information), may comprise two 32-bit registers (for buffering two cycles of information), etc. The input buffer 202 may thereafter transfer the information to circuitry 120. Alternatively, the upstream block interface 110 need not include an input buffer 202; rather, the information input from InfoIn may be sent directly to circuitry 120.

The upstream block interface 110 may further include a Receive_Ready_In signal circuit 204 for generating the signal on the Receive_Ready_In line. The signal on the Receive_Ready_In line may be dependent on the signal on the Transmit_Ready_In line, or may be independent of the signal on the Transmit_Ready_In line. For example, the signal on the Receive_Ready_In line may be LOW if the signal on the Transmit_Ready_In line is LOW. The signal on the Receive_Ready_In line may go HIGH only after the signal on the Transmit_Ready_In line goes HIGH, and only after the circuitry 120 sends a signal (such as a HIGH value) indicating that the circuitry 120 is ready to receive the information from InfoIn. This dependence of the Receive_Ready_In signal on the Transmit_Ready_In signal may be termed passive. An example of the Receive_Ready_In signal circuit 204 in a passive mode includes an AND gate with one input to the AND gate being the Transmit_Ready_In line and the second input to the AND gate being the Circuitry_Ready signal from the circuitry 120 indicating that the circuitry 120 is ready to receive the information from InfoIn. The output of the AND gate may comprise the Receive_Ready_In signal. Only after the signals of both of the inputs go HIGH will the output of the AND gate go high.

As another example, the signal on the Receive_Ready_In line may not be dependent on the signal on the Transmit_Ready_In line. Specifically, the signal on the Receive_Ready_In line may not wait until the signal on the Transmit_Ready_In line goes HIGH. An example of this may comprise the Circuitry_Ready line from the circuitry 120 being designated as the Receive_Ready_In line. When the circuitry 120 is ready (as indicated by the Circuitry_Ready line), the Receive_Ready_In line may go HIGH. Thus, the signal on the Receive_Ready_In line may go HIGH or LOW regardless of the signal on the Transmit_Ready_In line. This type of signaling may be termed aggressive. An aggressive Receive_Ready_In signal may provide faster throughput since the upstream block interface 110 does not wait at least one clock cycle to determine whether the signal on the Transmit_Ready_In line has gone HIGH.

The upstream block interface 110 may further receive a signal from softReset. This signal may be used to put the upstream block interface 110 into a known and predetermined state. For example, the signal on the Receive_Ready_In line may be set LOW, and the values in the registers of the input buffer 202 may likewise be set LOW. In this manner, when the system returns to normal operation (e.g., the softReset line goes LOW), the upstream block interface 110 may be in a known state.

Figure 3:
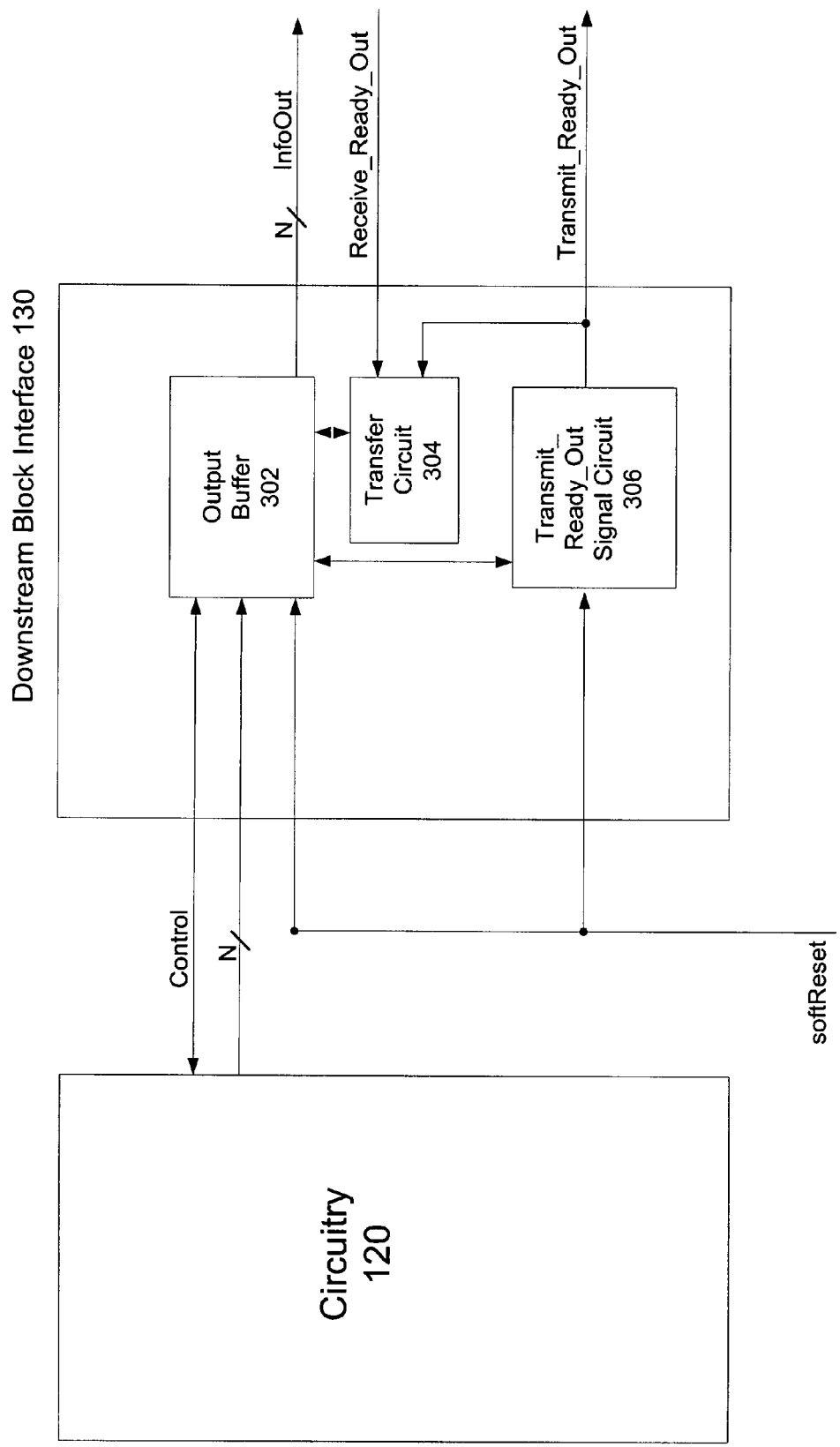
FIG. 3 is a block diagram of the downstream block interface as shown in FIG. 1.

An embodiment of the downstream block interface 130 is illustrated in FIG. 3. The downstream block interface 130 may include an output buffer 302 that buffers the information output from the circuitry 120. Control line(s) may communicate control information between the circuitry 120 and the output buffer 302 of the downstream block interface 130. Specifically, the output buffer 302 may communicate via the control line(s) with the circuitry 120 to indicate when the output buffer 302 is ready to receive data.

The output buffer 302 may comprise one or more registers for buffering the information from the circuitry 120. For example, the output buffer 302 may comprise a single 32-bit register (for an output buffer 302 that buffers one cycle of information), may comprise two 32-bit registers (for buffering two cycles of information), etc. The output buffer 302 may thereafter transfer the information to the N-lines designated as InfoOut based on the transfer circuit 304. Specifically, the transfer circuit 304 may control the output buffer 302 to transfer information onto the InfoOut lines when the signals on the Transmit_Ready_Out line and the Receive_Ready_Out line indicate that the block 100 and the downstream block 150 (from FIG. 1) are ready to transmit and receive information, respectively. An example of the transfer circuit 304 may comprise an AND gate, with the signals from the Transmit_Ready_Out and the Receive_Ready_Out lines (both HIGH when indicating readiness to transmit and receive, respectively) being input to the AND gate. The output of the AND gate may be used to control the output buffer 302.

The downstream block interface 130 may further include a Transmit_Ready_Out signal circuit 306. The Transmit_Ready_Out signal circuit 306 may generate the signal on the Transmit_Ready_Out line that is indicative that the block 100 (from FIG. 1) is ready to transmit data out. In one embodiment, the Transmit_Ready_Out signal circuit 306 may analyze the output buffer 302 to determine whether there is information in the output buffer 302 for transfer. For example, the Transmit_Ready_Out signal circuit 306 may have a counter, such as a counter that counts upward when data is transferred into the output buffer 302 and counts downward when data is transferred out of the output buffer 302. When the counter is greater than zero, then there is data in the buffer. Another example of the Transmit_Ready_Out signal circuit 306 may include analyzing one part of the output buffer 302. Specifically, the circuitry 120 may output N+1 lines, with N lines being the information for transfer and the additional bit to indicate that there is information in the output buffer 302 (e.g., the additional bit may be HIGH to indicate there is information in the register). The output buffer 302 may likewise be configured with one or more N+1 registers. The Transmit_Ready_Out signal circuit 306 may examine the bit in the most significant register (i.e., the register whose information is next in line to be transferred to InfoOut). If the bit is HIGH, then the Transmit_Ready_Out signal circuit 306 may conclude that there is information in the output buffer 302. Still another example of the Transmit_Ready_Out signal circuit 306 may comprise a FIFO analysis. These examples of the Transmit_Ready_Out signal circuit 306 are for illustrative purposes only.

The Transmit_Ready_Out signal circuit 306 may be independent of the size of the output buffer 302. For example, the same Transmit_Ready_Out signal circuit 306 may be used for an output buffer 302 that is a single N-bit register as for an output buffer 302 that includes multiple N-bit registers. Thus, the Transmit_Ready_Out signal circuit 306 used in the common interfaces in the blocks may be the same regardless of the output buffers 302 used, thereby simplifying the design. One example of the Transmit_Ready_Out signal circuit 306 described above includes a counter. The same counter may be used for determining whether there is information in the output buffer 302 regardless of whether the output buffer 302 is a single register or multiple registers.

The downstream block interface 130 may further receive a signal from softReset. This signal may be used to put the downstream block interface 130 into a known and predetermined state. For example, the signal on the Transmit_Ready_Out line may be set LOW, and the values in the registers of the output buffer 302 may likewise be set LOW. In this manner, when the system returns to normal operation (e.g., the softReset line goes LOW), the downstream block interface 130 may be in a known state.

Figure 4:
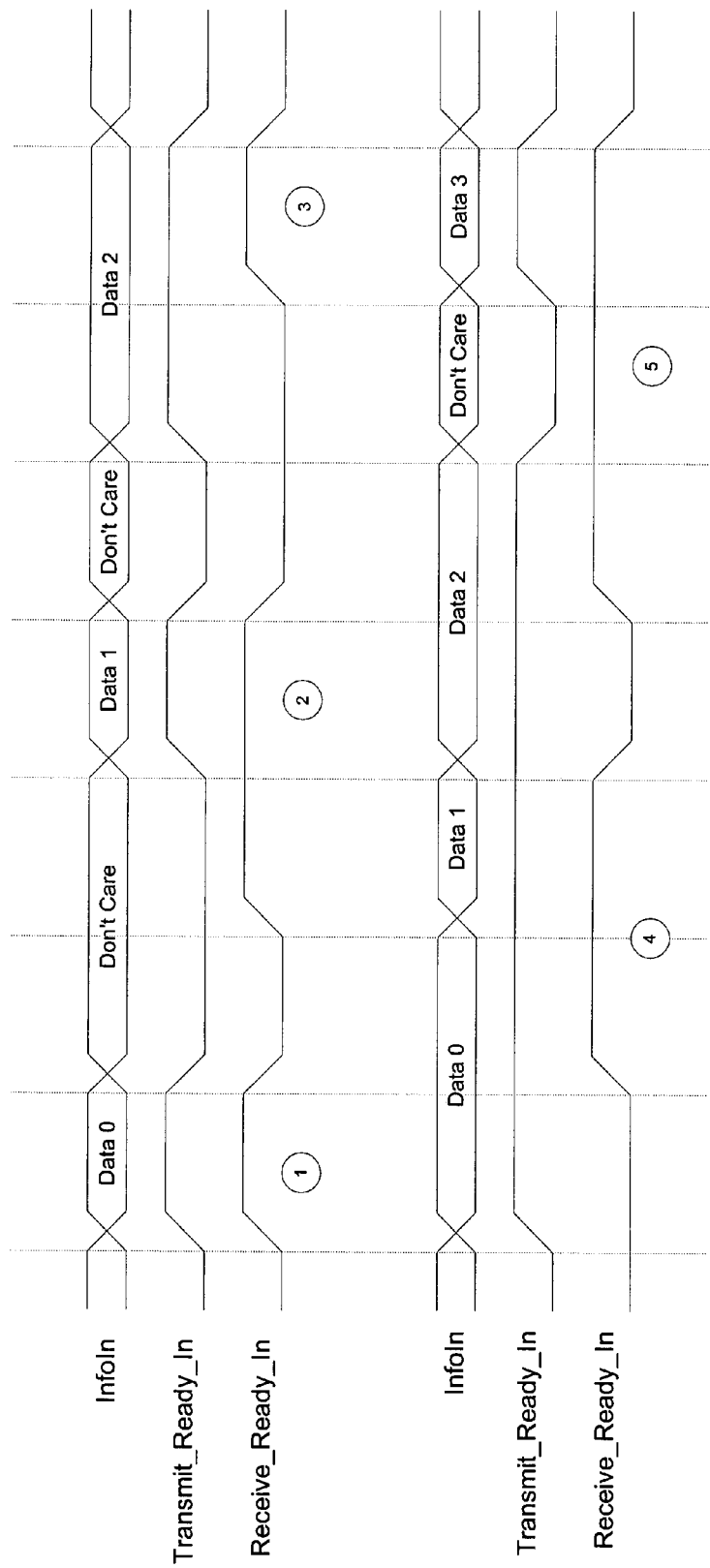
FIG. 4 illustrates a timing diagram for the block interface handshake protocol.

FIG. 4 illustrates a timing diagram for the block interface handshake protocol. Transaction #1 (as indicated by the waveforms above circle 1 in the timing diagram) illustrates a transaction where both the signals on the Transmit_Ready_In line and the Receive_Ready_In line are aggressors (e.g., neither signal is dependent on the other signal for its value). As shown in FIG. 4, the signals on both the Transmit_Ready_In line and the Receive_Ready_In line go HIGH at the same time. Thus, there is no delay in the transfer of Data 0 and Data 0 is transferred on the same clock cycle as when the signals on the Transmit_Ready_In line and the Receive_Ready_In line are HIGH.

Transaction #2 illustrates a transaction where both the signals on the Transmit_Ready_In line and the Receive_Ready_In line are aggressors, but that the signal on the Receive_Ready_In line is HIGH before the upstream block 140 is able to send data. The signal on the Receive_Ready_In line is held HIGH for multiple clock cycles waiting for the signal on the Transmit_Ready_In line to go HIGH (signalling valid data and control on the Common Block Interface).

Transaction #3 illustrates a transaction where the signal on the Transmit_Ready_In line is an aggressor and the signal on the Receive_Ready_In line is passive. The signal on the Transmit_Ready_In line goes HIGH and the signal on the Receive_Ready_In line does not go HIGH until after the signal on the Transmit_Ready_In line goes HIGH. The signal on the Transmit_Ready_In line may remain HIGH until it sees the signal on the Receive_Ready_In line goes HIGH, causing a valid data transfer on the Common Block Interface.

Transactions #4 and #5 show similar optional functionality of the Transmit_Ready_In line and the Receive_Ready_In line. Transaction #4 illustrates back-to-back valid transfers where both signals remain HIGH on both the Transmit_Ready_In line and the Receive_Ready_In line after a valid transfer. As shown, there are two valid data transfers occurring on consecutive clock cycles. Transaction #5 illustrates that the signal on the Receive_Ready_In line may have valid transfers on consecutive clock cycles, where the signal on the Transmit_Ready_In line goes LOW for only one clock cycle between transfers.

Figure 5:
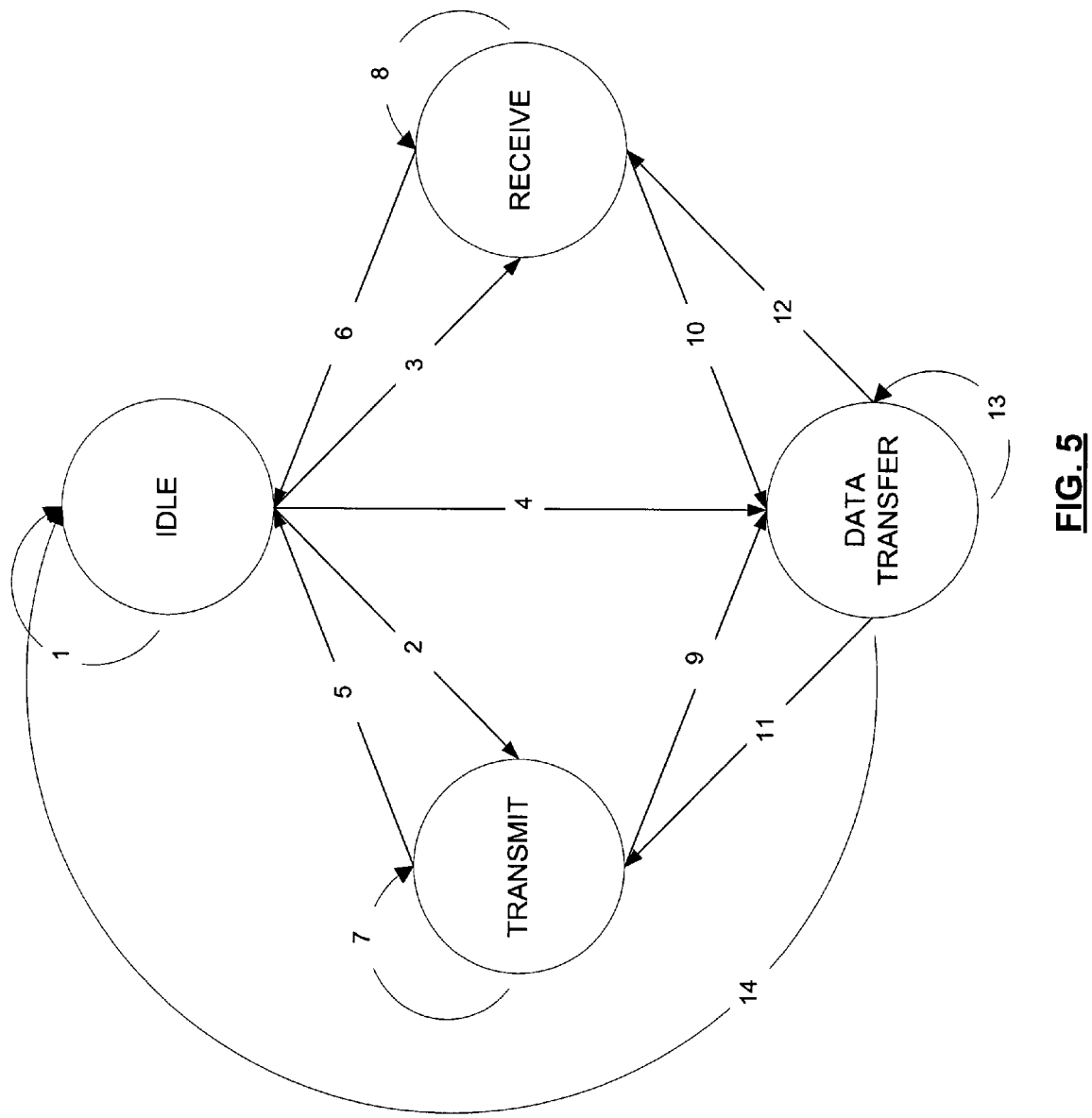
FIG. 5 illustrates a state diagram for the block interface handshake protocol.

As discussed above, one or both of the upstream block interface 110 or the downstream block interface 130 may be included in each block. This results in common block interfaces for the handshaking protocols between the blocks of an electronic component. FIG. 5 illustrates a state diagram for the common block interface handshake protocol. The state diagram may be based on the signals of the Transmit_Ready and the Receive_Ready lines. Specifically, the signals of the Transmit_Ready and the Receive_Ready lines create all the states that are valid for the Common Block Interface. As discussed in more detail below, the states may depend on whether one or both of the signals of the Transmit_Ready and the Receive_Ready lines is aggressive or passive.

As shown in FIG. 5, there are four states and various state arcs that are valid for the Common Block Interface protocol. Table 1, below, illustrates the values on the signals for the Transmit_Ready and the Receive_Ready lines and the corresponding states:

TABLE 1

| STATE | Transmit_Ready | Receive_Ready |
|---|---|---|
| IDLE | 0 | 0 |
| RECEIVE | 0 | 1 |
| TRANSMIT | 1 | 0 |
| DATA TRANSFER | 1 | 1 |

During a softReset (such as when softReset goes HIGH), the state machine may reset to a known state, such as the IDLE state. Table 2, below, describes the arcs in FIG. 5. "A" designates an aggressive Receive_Ready signal (e.g., independent of the Transmit_Ready signal) and "P" designates a passive Receive_Ready signal (e.g., dependent on the Transmit_Ready signal).

TABLE 2

| Arc Number | Present State | Next State | Condition |
|---|---|---|---|
| 1 | IDLE | IDLE | A: softReset<br>P: softReset or<br>(!Transmit_Ready and<br>!Receive_Ready) |
| 2 | IDLE | TRANSMIT | Transmit_Ready |
| 3 | IDLE | RECEIVE | Receive_Ready (no arc for P) |
| 4 | IDLE | DATA TRANSFER | A: Transmit_Ready and Receive_Ready<br>P: Not a Valid Arc |
| 5 | TRANSMIT | IDLE | softReset |
| 6 | RECEIVE | IDLE | softReset |
| 7 | TRANSMIT | TRANSMIT | !Receive_Ready |
| 8 | RECEIVE | RECEIVE | !Transmit_Ready |
| 9 | TRANSMIT | DATA TRANSFER | Receive_Ready |
| 10 | RECEIVE | DATA TRANSFER | Transmit_Ready (no arc for P) |
| 11 | DATA TRANSFER | TRANSMIT | !Receive_Ready and Transmit_Ready |
| 12 | DATA TRANSFER | RECEIVE | !Transmit_Ready and Receive_Ready (no arc for P) |
| 13 | DATA TRANSFER | DATA TRANSFER | Transmit_Ready and Receive_Ready |
| 14 | DATA TRANSFER | IDLE | softReset or (!Transmit_Ready and !Receive_Ready) |

As shown in Table 2 and FIG. 5, for a passive Receive_Ready signal, the RECEIVE state is not reachable. Since the RECEIVE state is not reachable, all arcs to and from the RECEIVE state are not valid arcs for a passive Receive_Ready signal.

Figure 6:
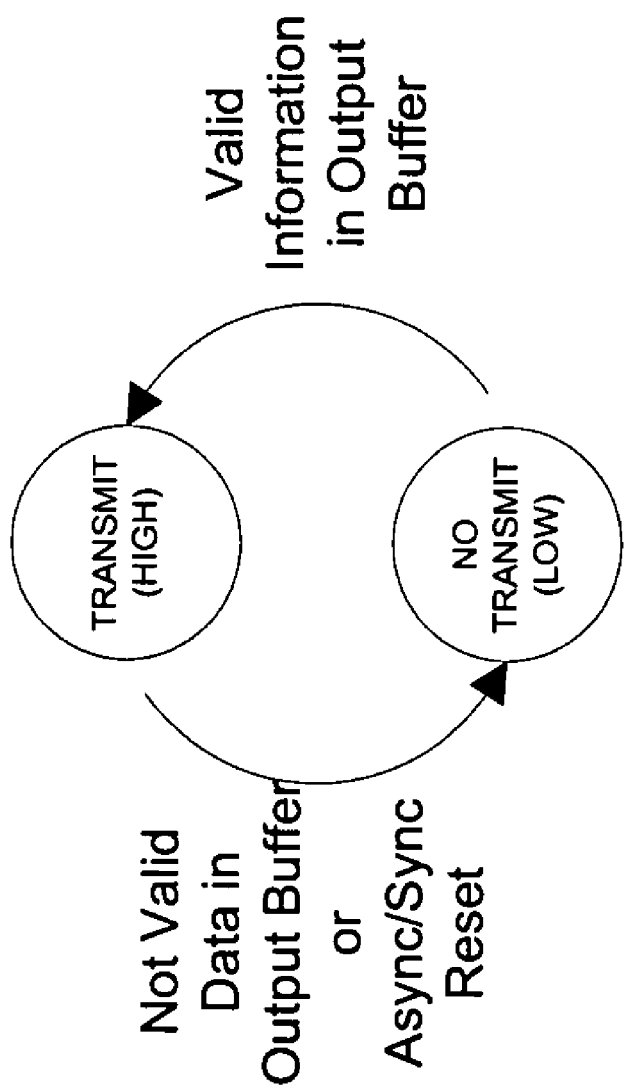
FIG. 6 illustrates a state diagram for the Transmit_Ready line output from the downstream block interface.

FIG. 6 illustrates a state diagram for the Transmit_Ready line output from the downstream block interface 130. As shown in FIG. 6, the signal on the Transmit_Ready line is HIGH when there is valid information in the output buffer 302. If there is no valid information or if there is a reset (such as a synchronous or asynchronous reset), the signal on the Transmit_Ready line is LOW.

Figure 7A:
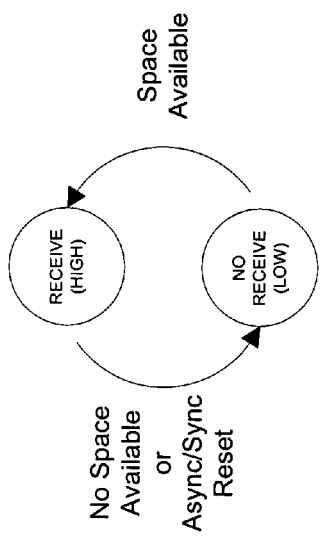
FIG. 7A illustrates one example of a state diagram for the Receive_Ready line output from the upstream block interface.

FIG. 7A illustrates one example of a state diagram for the Receive_Ready line output from the upstream block interface 110 where the Receive_Ready line is aggressive. As shown, in FIG. 7A, the signal on the Receive_Ready line is HIGH when there is space available (either in input buffer 202 or in the circuitry 120 if the input buffer 202 is not present). If there is no space available or if there is a reset (such as a synchronous or asynchronous reset), the signal on the Receive_Ready line is LOW. The determination of whether space is available may be based on whether there is currently space available (e.g., during the current clock cycle). Or, the determination may comprise whether space is currently available or will become available (e.g., during the next clock cycle). This may be acceptable even though the space is currently filled since the signal may be used to fill the space in the next clock cycle.

For this implementation, the Receive_Ready_In (shown in FIGS. 1 and 2) may be a function of the internal state (Receive High) and also a function of the Transmit signals (Receive_Ready_Out and Transmit_Ready_Out). Since it is a function of the current state of Receive_Ready_Out that is generated by the downstream block 150, timing may be affected by the timing of the downstream block 150. For example, if the Receive_Ready_Out signal from the downstream block 150 is high (indicating that either in the current clock cycle space is available or in the next clock cycle space will be available) and the Transmit_Ready_Out in block 100 is high (indicating that block 100 in the current or next clock cycle is ready to output data), block 100 may communicate these signals to the Receive_Ready_In signal circuit 204. The Receive_Ready_In signal circuit 204, anticipating that space will be freed in the input buffer 202 in the next clock cycle may change Receive_Ready_In signal high to indicate readiness to receive data in the input buffer 202 in the next clock cycle.

If the more complex space available determination (e.g., space currently or in the next clock cycle available) is used in several adjacent blocks, each block may be dependent on the timing of the signal from the blocks that are downstream. In this way, the timing may be accumulative. If each block delays the signal 1 ns (e.g., the time it takes for block 100 to determine that space will be available in the next clock cycle in the input buffer 202 and to change the value of the Receive_Ready_In signal) and there are 10 sub-blocks the upper most upstream block may have to wait 9 ns for the farthest downstream blocks signal to propagate through all of the intermediate sub-blocks. In this manner, the more complex, but potentially faster space available definition for internal connections (between blocks) may be used where one may time and constrain the number of sub-blocks the handshake signals pass through and use the simpler space available at the last block so that the timing will not be dependent on how many other blocks are attached to this block.

Figure 7B:
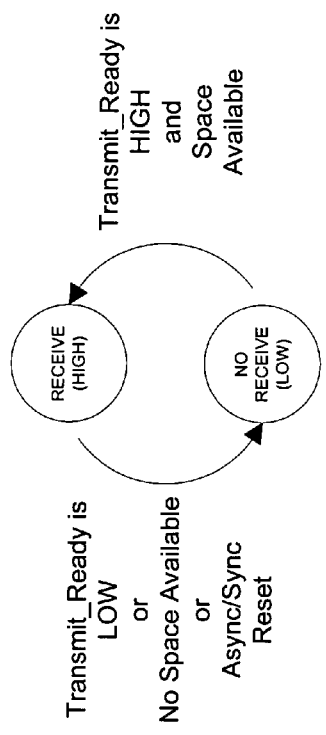
FIG. 7B illustrates another example of a state diagram for the Receive_Ready line output from the upstream block interface.

FIG. 7B illustrates another example of a state diagram for the Receive_Ready line output from the upstream block interface where the Receive_Ready line is passive. As shown in FIG. 7B, the signal on the Receive_Ready line is HIGH when there is space available (either in input buffer 202 or in the circuitry 120 if the input buffer 202 is not present) and the signal on the Transmit_Ready is HIGH. If the signal on the Transmit_Ready is LOW, if there is no space available in the buffer (e.g., in the passive mode), or if there is a reset (such as a synchronous or asynchronous reset), the signal on the Receive_Ready line is LOW.

Referring now to FIGS. 8A-8H, various exemplary electronic components are shown. The electronic components may be divided into blocks, such as based on the different functions performed by the electronic components.

As shown in FIG. 8A, the present invention can be implemented in a scanner 800. The scanner 800 may include a scanner processor 801 and a memory 802. The memory may include a scanning program that may perform scanning functions such as normalizing the raw scanned data, excluding data outside of the margins, and performing color correction. The scanning program may be implemented using the common block interface described above. The scanner may further include a light output 804, which may include a light output interface (for interfacing with the scanner processor 801) and a plurality of light sources (such as light emitting diodes or other suitable light sources). The scanner may also include a sensor input 803, which may include both a sensor input interface (for interfacing with the scanner processor 801) and a contact image sensor (CIS) (for receiving light reflected from the scan target).

Figure 8C:
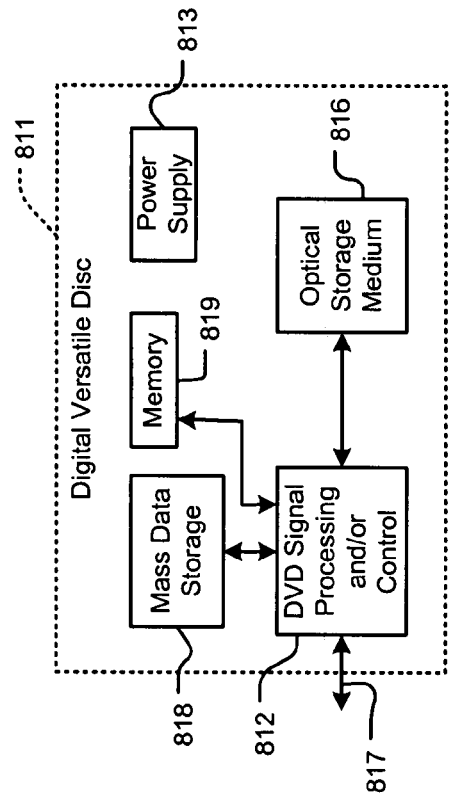
FIG. 8C is a functional block diagram of a digital versatile disk (DVD).
Figure 8B:
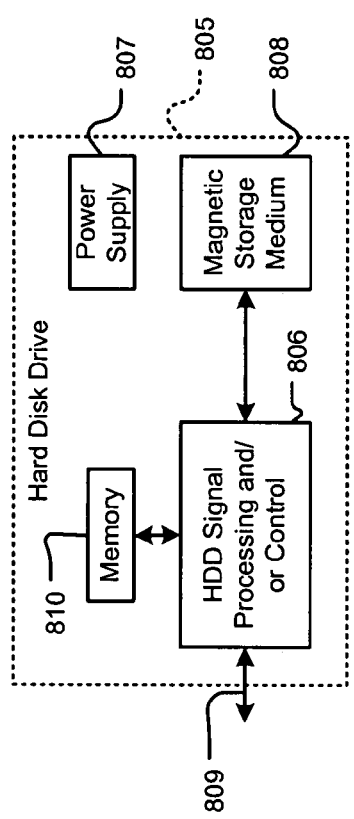
FIG. 8B is a functional block diagram of a hard disk drive.

As shown in FIG. 8B, the present invention can be implemented in a hard disk drive (HDD) 805. The common block interface of the present invention may be implemented in either or both signal processing and/or control circuits 806 and/or a power supply 807. In some implementations, the signal processing and/or control circuit 806 and/or other circuits (not shown) in the HDD 805 may process data, perform coding and/or encryption, perform calculations, and/or format data that is output to and/or received from a magnetic storage medium 808.

The HDD 805 may communicate with a host device (not shown) such as a computer, mobile computing devices such as personal digital assistants, cellular phones, media or MP3 players and the like, and/or other devices via one or more wired or wireless communication links 809. The HDD 805 may be connected to memory 810 such as random access memory (RAM); low latency nonvolatile memory, such as flash memory; read only memory (ROM); and/or any other suitable electronic data storage.

Referring now to FIG. 8C, the present invention can be implemented in a digital versatile disc (DVD) drive 811. The common block interface of the present invention may be implemented in either or both signal processing and/or control circuits, which are generally identified in FIG. 8C at 812, mass data storage 818 of the DVD drive 811 and/or a power supply 813. The signal processing and/or control circuit 812 and/or other circuits (not shown) in the DVD drive 811 may process data, perform coding and/or encryption, perform calculations, and/or format data that is read from and/or data written to an optical storage medium 816. In some implementations, the signal processing and/or control circuit 812 and/or other circuits (not shown) in the DVD drive 811 can also perform other functions such as encoding, and/or decoding, and/or any other signal processing functions associated with a DVD drive.

The DVD drive 811 may communicate with an output device (not shown) such as a computer, television, or other device via one or more wired or wireless communication links 817. The DVD drive 811 may communicate with mass data storage 818 that stores data in a nonvolatile manner. The mass data storage 818 may include a hard disk drive (HDD). The HDD may have the configuration shown in FIG. 8B. The HDD may be a mini HDD that includes one or more platters having a diameter that is smaller than approximately 1.8" The DVD drive 810 may be connected to memory 819 such as RAM, ROM, low latency nonvolatile memory such as flash memory, and/or any other suitable electronic data storage.

Figure 8E:
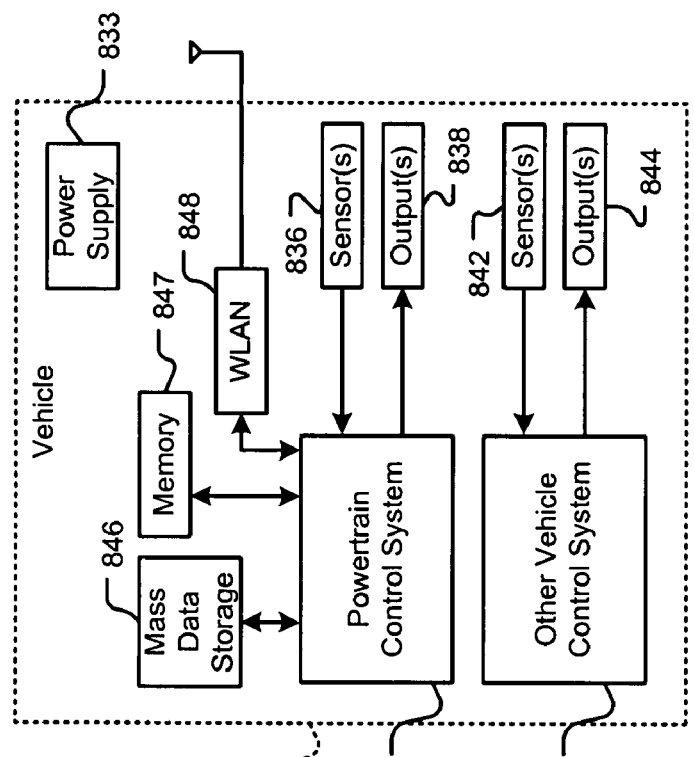
FIG. 8E is a functional block diagram of a vehicle control system.
Figure 8D:
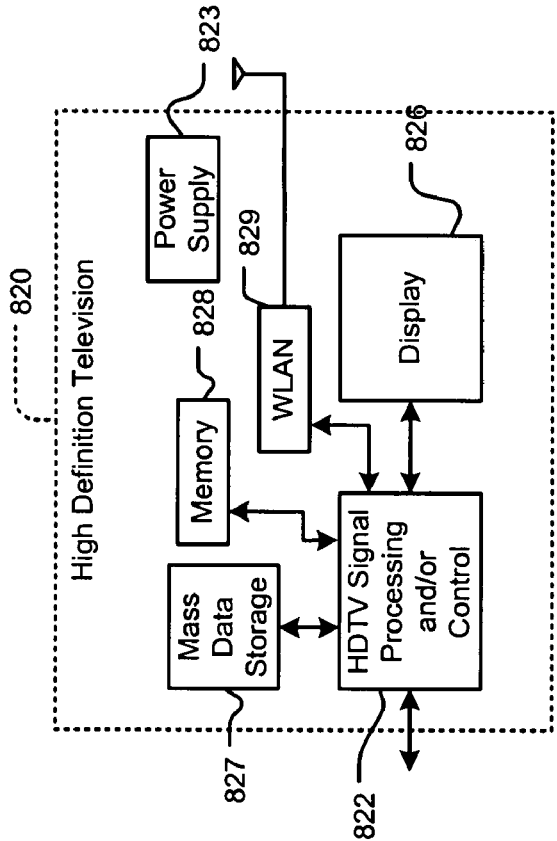
FIG. 8D is a functional block diagram of a high definition television.

Referring now to FIG. 8D, the present invention can be implemented in a high definition television (HDTV) 820. The common block interface of the present invention may be implemented in either or both signal processing and/or control circuits, which are generally identified in FIG. 8D at 822, a WLAN interface 829, mass data storage 827 of the HDTV 820 and/or a power supply 823. The HDTV 820 receives HDTV input signals in either a wired or wireless format and generates HDTV output signals for a display 826. In some implementations, a signal processing circuit and/or control circuit 822 and/or other circuits (not shown) of the HDTV 820 may process data, perform coding and/or encryption, perform calculations, format data and/or perform any other type of HDTV processing that may be required.

The HDTV 820 may communicate with mass data storage 827 that stores data in a nonvolatile manner such as optical and/or magnetic storage devices. At least one HDD may have the configuration shown in FIG. 8B and/or at least one DVD drive may have the configuration shown in FIG. 8C. The HDD may be a mini HDD that includes one or more platters having a diameter that is smaller than approximately 1.8". The HDTV 820 may be connected to memory 828 such as RAM, ROM, low latency nonvolatile memory such as flash memory, and/or any other suitable electronic data storage. The HDTV 820 also may support connections with a WLAN via the WLAN interface 829.

Referring now to FIG. 8E, the common block interface of the present invention may be implemented in a control system of a vehicle 830, a WLAN interface 848, mass data storage 846 of the vehicle control system, and/or a power supply 833. In some implementations, the present invention may be implemented in a powertrain control system 832 that receives inputs from one or more sensors 836, such as temperature sensors, pressure sensors, rotational sensors, airflow sensors, and/or any other suitable sensors. The powertrain control system 832 may generate one or more output control signals 838, such as engine operating parameters, transmission operating parameters, and/or other control signals.

The present invention may also be implemented in other control systems 840 of the vehicle 830. The control system 840 may likewise receive signals from input sensors 842 and/or output control signals to one or more output devices 844. In some implementations, the control system 840 may be part of an anti-lock braking system (ABS), a navigation system, a telematics system, a vehicle telematics system, a lane departure system, an adaptive cruise control system, or a vehicle entertainment system such as a stereo, DVD, compact disc and the like. Still other implementations are contemplated.

The powertrain control system 832 may communicate with mass data storage 846 that stores data in a nonvolatile manner. The mass data storage 846 may include optical and/or magnetic storage devices, such as HDDs and/or DVD drives. At least one HDD may have the configuration shown in FIG. 8B and/or at least one DVD drive may have the configuration shown in FIG. 8C. The HDD may be a mini HDD that includes one or more platters having a diameter that is smaller than approximately 1.8". The powertrain control system 832 may be connected to memory 847 such as RAM, ROM, low latency nonvolatile memory such as flash memory, and/or any other suitable electronic data storage. The powertrain control system 832 also may support connections with a WLAN via the WLAN interface 848. The control system 840 may also include mass data storage, memory, and/or a WLAN interface (all not shown).

Figure 8F:
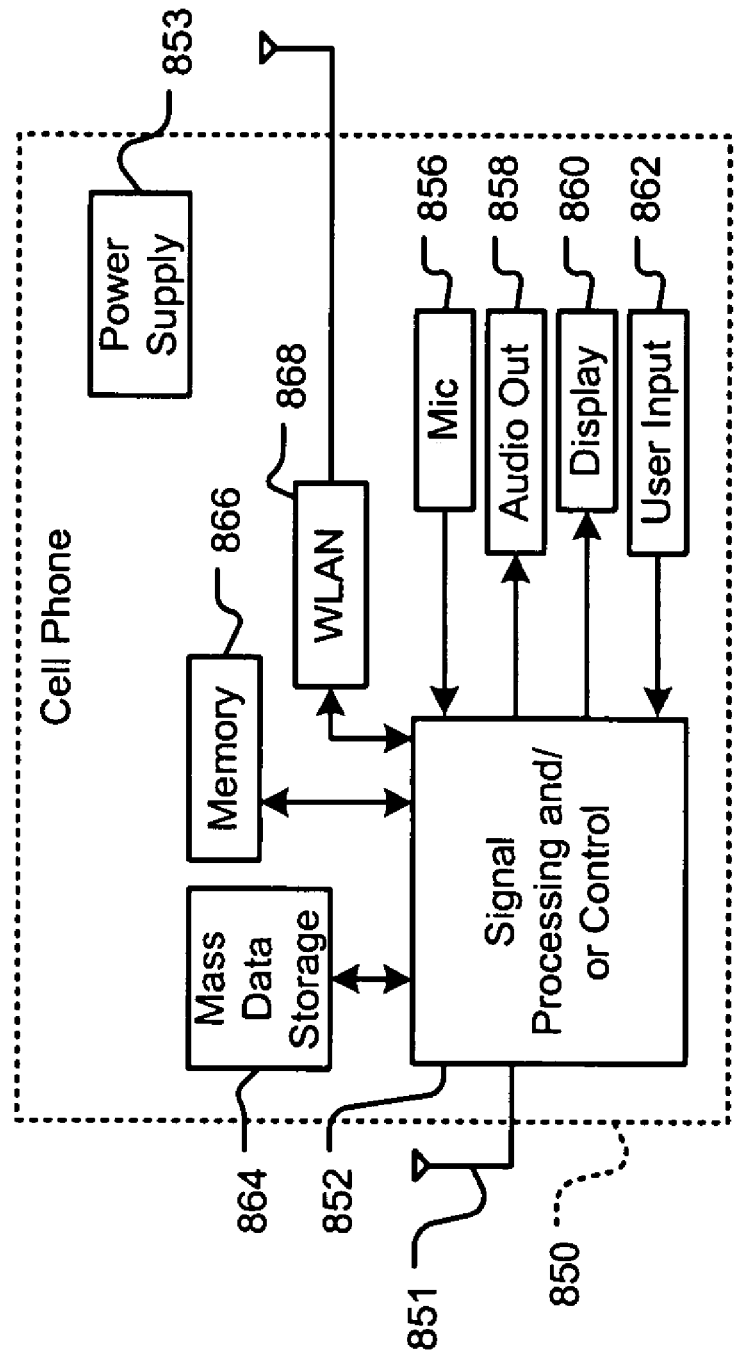
FIG. 8F is a functional block diagram of a cellular phone.

Referring now to FIG. 8F, the present invention can be implemented in a cellular phone 850 that may include a cellular antenna 851. The common block interface of the present invention may be implemented in either or both signal processing and/or control circuits, which are generally identified in FIG. 8F at 852, a WLAN interface 868, mass data storage 864 of the cellular phone 850, and/or a power supply 853. In some implementations, the cellular phone 850 includes a microphone 856, an audio output 858 such as a speaker and/or audio output jack, a display 860 and/or an input device 862 such as a keypad, pointing device, voice actuation and/or other input device. The signal processing and/or control circuits 852 and/or other circuits (not shown) in the cellular phone 850 may process data, perform coding and/or encryption, perform calculations, format data and/or perform other cellular phone functions.

The cellular phone 850 may communicate with mass data storage 864 that stores data in a nonvolatile manner such as optical and/or magnetic storage devices, such as HDDs and/or DVD drives. At least one HDD may have the configuration shown in FIG. 8B and/or at least one DVD drive may have the configuration shown in FIG. 8C. The HDD may be a mini HDD that includes one or more platters having a diameter that is smaller than approximately 1.8". The cellular phone 850 may be connected to memory 866 such as RAM, ROM, low latency nonvolatile memory such as flash memory, and/or any other suitable electronic data storage. The cellular phone 850 also may support connections with a WLAN via the WLAN interface 868.

Figure 8G:
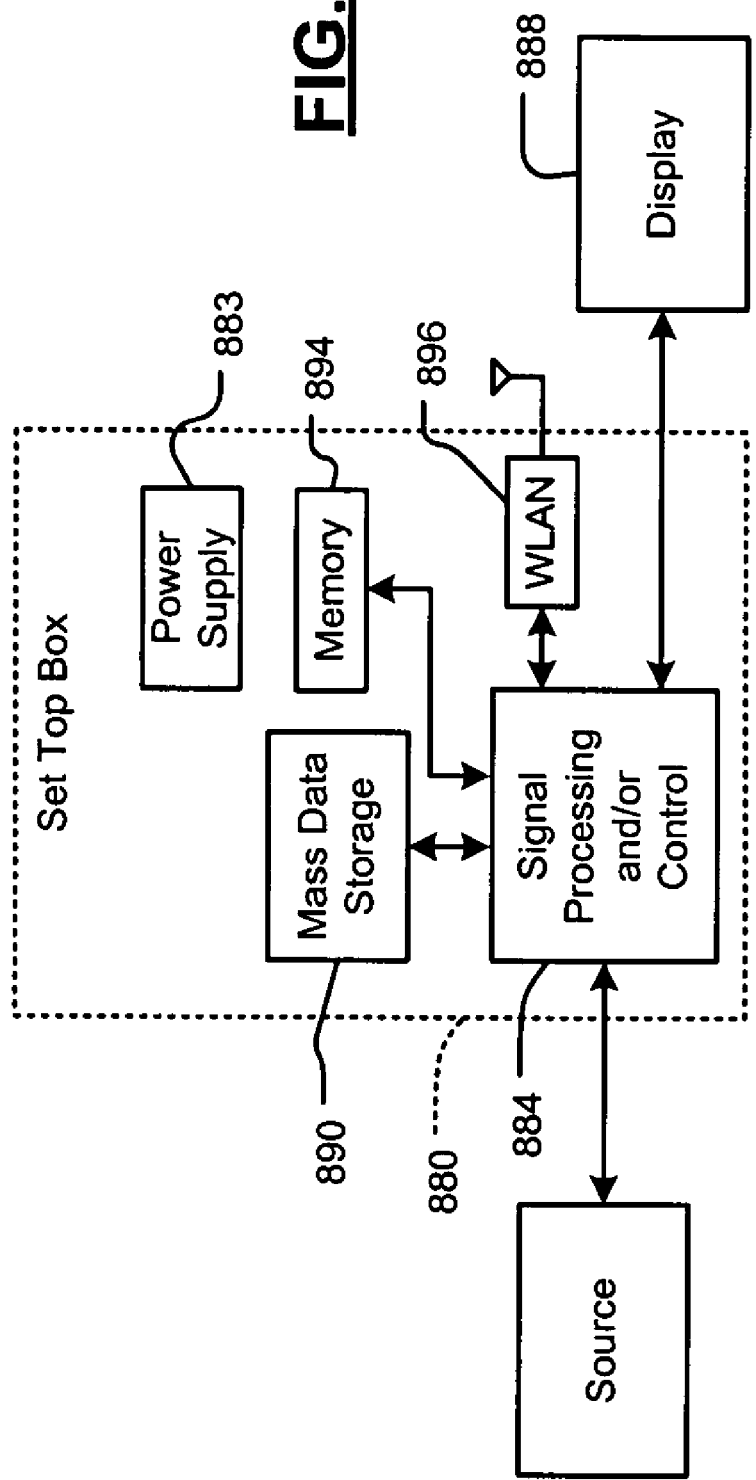
FIG. 8G is a functional block diagram of a set top box.

Referring now to FIG. 8G, the present invention can be implemented in a set top box 880. The common block interface of the present invention may be implemented in either or both signal processing and/or control circuits, which are generally identified in FIG. 8G at 884, a WLAN interface 896, mass data storage 890 of the set top box 880, and/or a power supply 883. The set top box 880 receives signals from a source such as a broadband source and outputs standard and/or high definition audio/video signals suitable for a display 888 such as a television, a monitor, and/or other video and/or audio output devices. The signal processing, and/or control circuits 884, and/or other circuits (not shown) of the set top box 880 may process data, perform coding and/or encryption, perform calculations, format data, and/or perform any other set top box functions.

The set top box 880 may communicate with mass data storage 890 that stores data in a nonvolatile manner. The mass data storage 890 may include optical and/or magnetic storage devices, such as HDDs and/or DVD drives. At least one HDD may have the configuration shown in FIG. 8B and/or at least one DVD drive may have the configuration shown in FIG. 8C. The HDD may be a mini HDD that includes one or more platters having a diameter that is smaller than approximately 1.8". The set top box 880 may be connected to memory 894 such as RAM, ROM, low latency nonvolatile memory such as flash memory, and/or any other suitable electronic data storage. The set top box 880 also may support connections with a WLAN via the WLAN interface 896.

Figure 8H:
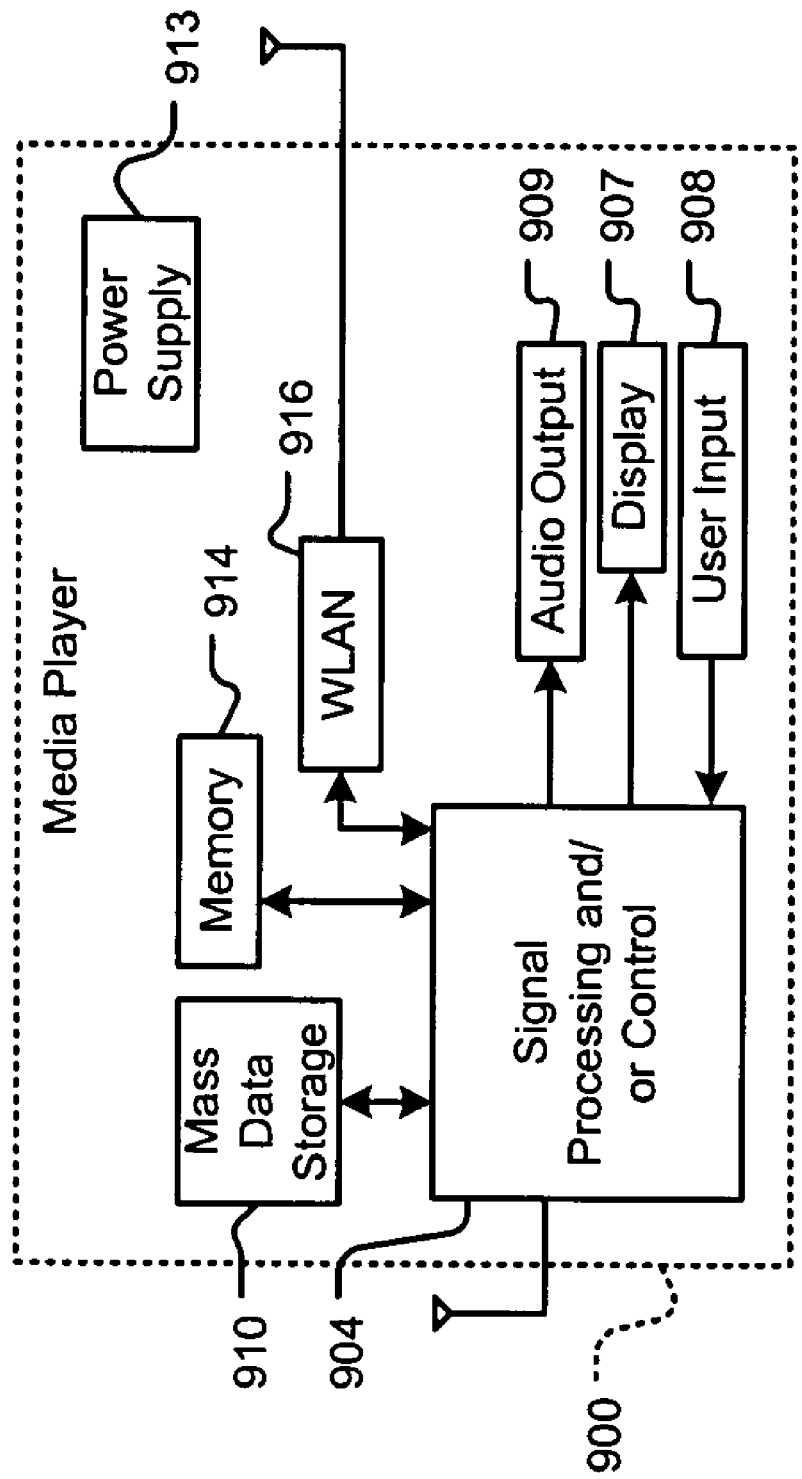
FIG. 8H is a functional block diagram of a media player.

Referring now to FIG. 8H, the present invention can be implemented in a media player 900. The common block interface of the present invention may be implemented in either or both signal processing and/or control circuits, which are generally identified in FIG. 8H at 904, a WLAN interface 916, mass data storage 910 of the media player 900, and/or a power supply 913. In some implementations, the media player 900 includes a display 907 and/or a user input 908 such as a keypad, touchpad and the like. In some implementations, the media player 900 may employ a graphical user interface (GUI) that typically employs menus, drop down menus, icons and/or a point-and-click interface via the display 907, and/or user input 908. The media player 900 further includes an audio output 909 such as a speaker and/or audio output jack. The signal processing and/or control circuits 904 and/or other circuits (not shown) of the media player 900 may process data, perform coding and/or encryption, perform calculations, format data, and/or perform any other media player functions.

The media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage 910 may include optical and/or magnetic storage devices, such as HDDs and/or DVD drives. At least one HDD may have the configuration shown in FIG. 8B and/or at least one DVD drive may have the configuration shown in FIG. 8C. The HDD may be a mini HDD that includes one or more platters having a diameter that is smaller than approximately 1.8". The media player 900 may be connected to memory 914 such as RAM, ROM, low latency nonvolatile memory such as flash memory, and/or any other suitable electronic data storage. The media player 900 also may support connections with a WLAN via the WLAN interface 916. Still other implementations in addition to those described above are contemplated.

It is intended that the foregoing detailed description be understood as an illustration of selected forms that the invention can take, and not as a definition of the invention. It is only the following claims, including all equivalents, that are intended to define the scope of this invention.

What is claimed is:

1. An electronic component comprising:
   a logic component;
   an upstream interface circuit; and
   a downstream interface circuit;
   wherein the logic component is associated with the upstream interface circuit and the downstream interface circuit of the electronic component,
   wherein the upstream interface circuit comprises:
      an input signal path configured to receive data from an upstream logic component;
      an input buffer configured to receive the data from the input signal path;
      an upstream transmit readiness signal path configured to receive an upstream transmit readiness signal from the upstream logic component; and
      an upstream receive readiness signal path configured to transmit an upstream receive readiness signal to the upstream logic component, the upstream receive readiness signal indicative of readiness of the logic component associated with the upstream interface circuit and the downstream interface circuit of the electronic component, and
   wherein the downstream interface circuit comprises:
      an output signal path configured to output data from the logic component associated with the upstream interface circuit and the downstream interface circuit of the electronic component to a downstream logic component;
      a downstream transmit readiness signal path configured to transmit a downstream transmit readiness signal to the downstream logic component; and
      a downstream readiness signal path configured to receive a downstream receive readiness signal from the downstream logic component,
   wherein the upstream interface circuit is configured to generate the upstream receive readiness signal in response to an associated logic component readiness signal, the associated logic component readiness signal being indicative of readiness of the logic component associated with the upstream interface circuit and the downstream interface circuit of the electronic component to receive the data, and wherein the logic component associated with the upstream interface circuit and the downstream interface circuit of the electronic component comprises circuitry that is configured to perform one or more functions on the data.

2. The electronic component of claim 1, wherein the data is transferred from the upstream logic component to the input signal path further when the upstream transmit readiness signal is indicative of readiness of the upstream logic component to transmit the data.

3. The electronic component of claim 2, wherein the upstream receive readiness signal is dependent on the upstream transmit readiness signal.

4. The electronic component of claim 3, wherein the upstream receive readiness signal path is configured to transmit the upstream receive readiness signal indicative of readiness of the associated logic component associated with the upstream interface circuit and the downstream interface circuit of the electronic component to receive data only after the upstream transmit readiness signal is indicative of readiness of the upstream logic component to transmit the data.

5. The electronic component of claim 2, wherein the upstream receive readiness signal is independent of the upstream transmit readiness signal.

6. The electronic component of claim 1, wherein the output signal path of the downstream interface circuit is configured to output data from the logic component associated with the upstream interface circuit and the downstream interface circuit of the electronic component to the downstream logic component when the downstream transmit readiness signal is indicative of readiness of the logic component associated with the upstream interface circuit and the downstream interface circuit of the electronic component to output the data and when the downstream receive readiness signal is indicative of readiness of the downstream logic component to receive the data.

7. The electronic component of claim 6, wherein the downstream receive readiness signal is dependent on the downstream transmit readiness signal.

8. The electronic component of claim 6, wherein the downstream receive readiness signal is independent of the downstream transmit readiness signal.

9. The electronic component of claim 1, wherein the upstream receive readiness signal path is configured to transmit the upstream receive readiness signal to the upstream logic component independent of size of the input buffer.

10. The electronic component of claim 1, wherein the upstream receive readiness signal path is configured to receive a reset signal;

wherein the upstream receive readiness signal path is adapted to generate a predetermined signal for the upstream receive readiness signal upon receipt of the reset signal indicative of reset;

wherein the input buffer is configured to receive the reset signal; and wherein the input buffer is assigned predetermined values upon receipt of the reset signal indicative of reset.

11. The electronic component of claim 1, wherein handshaking between the upstream interface circuit and the upstream logic component consists of the upstream transmit readiness signal and the upstream receive readiness signal; and wherein handshaking between the downstream interface circuit and the downstream logic component consists of the downstream transmit readiness signal and the downstream receive readiness signal.

12. The electronic component of claim 1, wherein the input signal path comprises n lines; and wherein the output signal path comprises n lines.

13. The electronic component of claim 1, wherein the upstream receive readiness signal is indicative of readiness of the logic component associated with the upstream interface circuit and the downstream interface circuit of the electronic component to receive data in a current clock cycle or a next clock cycle.

14. The electronic component of claim 13, wherein the downstream receive readiness signal is indicative of readiness of the downstream logic component to receive data in the current clock cycle or the next clock cycle; and wherein the upstream receive readiness signal path determines in the current clock cycle readiness to receive data in the next clock cycle based on the downstream receive readiness signal; and wherein the upstream receive readiness signal path changes the upstream receive readiness signal in the current clock cycle if, based on the downstream receive readiness signal, readiness to receive data in the next clock cycle is determined.

15. A scanner incorporating the electronic component of claim 1.

16. A multi-function printer incorporating the electronic component of claim 1.

17. A hard disk drive incorporating the electronic component of claim 1.

18. A vehicle control system incorporating the electronic component of claim 1.

19. A cellular phone incorporating the electronic component of claim 1.

20. A set top box incorporating the electronic component of claim 1.

21. The electronic component of claim 1, wherein the logic component associated with the upstream interface circuit and the downstream interface circuit of the electronic component is configured to be in serial communication with the upstream logic component and the downstream logic component.

22. An electronic component comprising:

a logic component;

an upstream interface circuit; and a downstream interface circuit;

wherein the logic component is associated with the upstream interface circuit and the downstream interface circuit of the electronic component, wherein the upstream interface circuit comprises:

buffer means for receiving data from an upstream logic component;

means for receiving an upstream transmit readiness signal from the upstream logic component; and means for transmitting an upstream receive readiness signal to the upstream logic component, the upstream receive readiness signal indicative of readiness of the logic component associated with the upstream interface circuit and the downstream interface circuit of the electronic component, and wherein the downstream interface circuit comprising comprises:

means for outputting data from the logic component associated with the upstream interface circuit and the downstream interface circuit of the electronic component to a downstream logic component;

means for transmitting a downstream transmit readiness signal to the downstream logic component; and means for receiving a downstream receive readiness signal from the downstream logic component, wherein the upstream interface circuit is configured to generate the upstream receive readiness signal in response to an associated logic component readiness signal, the associated logic component readiness signal being indicative of readiness of the logic component associated with the upstream interface circuit and the downstream interface circuit of the electronic component to receive the data; and wherein the logic component associated with the upstream interface circuit and the downstream interface circuit of the electronic component comprises circuitry that is configured to perform one or more functions on the data.

23. The electronic component of claim 22, wherein the upstream receive readiness signal is dependent on the upstream transmit readiness signal.

24. The electronic component of claim 23, wherein the means for transmitting the upstream receive readiness signal transmits the upstream receive readiness signal indicative of readiness of the logic component associated with the upstream interface circuit and the downstream interface circuit of the electronic component to receive data only after the upstream transmit readiness signal is indicative of readiness of the upstream logic component to transmit the data.

25. The electronic component of claim 22, wherein the upstream receive readiness signal is independent of the upstream transmit readiness signal.

26. The electronic component of claim 22, wherein the downstream receive readiness signal is dependent on the downstream transmit readiness signal.

27. The electronic component of claim 22, wherein the downstream receive readiness signal is independent of the downstream transmit readiness signal.

28. The electronic component of claim 22, wherein the means for transmitting an upstream receive readiness signal generates a predetermined signal for the upstream receive readiness signal upon receipt of a reset signal.

29. The electronic component of claim 22, wherein the one or more functions comprises: normalizing the data, excluding at least some of the data outside of one or more margins, or performing color correction.

30. The electronic component of claim 22, wherein the logic component associated with the upstream interface circuit and the downstream interface circuit of the electronic component is configured to be in serial communication with the upstream logic component and the downstream logic component.

31. A method for transferring data in an electronic component having a logic component, an upstream interface circuit, and a downstream interface circuit, the logic component being associated with the upstream interface circuit and the downstream interface circuit of the electronic component, the method for transferring data to and from the logic component comprising:

receiving an upstream transmit readiness signal from an upstream logic component;

transmitting an upstream receive readiness signal to the upstream logic component;

receiving data from the upstream logic component and buffering the data in a buffer when the upstream transmit readiness signal is indicative of readiness of the upstream logic component to transmit the data and when the upstream receive readiness signal is indicative of readiness of the logic component associated with the upstream interface circuit and the downstream interface circuit of the electronic component to receive the data, wherein the associated logic component comprises circuitry that is configured to perform one or more functions on the data;

transmitting a downstream transmit readiness signal to a downstream logic component;

receiving a downstream receive readiness signal from the downstream logic component; and outputting data from the logic component associated with the upstream interface circuit and the downstream interface circuit of the electronic component when the downstream transmit readiness signal is indicative of readiness of the logic component to output the data and when the downstream receive readiness signal is indicative of readiness of the downstream logic component to receive the data.

32. The method of claim 31, wherein the upstream receive readiness signal is dependent on the upstream transmit readiness signal.

33. The method of claim 32, wherein the upstream receive readiness signal, indicative of the logic component associated with the upstream interface circuit and the downstream interface circuit of the electronic component to receive data, is transmitted only after the upstream transmit readiness signal is indicative of readiness of the upstream logic component to transmit the data.

34. The method of claim 31, wherein the upstream receive readiness signal is independent of the upstream transmit readiness signal.

35. The method of claim 31, wherein the downstream receive readiness signal is dependent on the downstream transmit readiness signal.

36. The method of claim 31, wherein the downstream receive readiness signal is independent of the downstream transmit readiness signal.

37. The method of claim 31, wherein the upstream receive readiness signal is generated independent of size of the buffer.

38. The method of claim 31, further comprising:

receiving a reset signal;

generating a predetermined signal for the upstream receive readiness signal upon receipt of the reset signal indicative of reset; and assigning predetermined values to the buffer upon receipt of the reset signal indicative of reset.

39. The method of claim 31, wherein the upstream receive readiness signal is indicative of readiness of the associated logic component to receive data in a current or a next clock cycle.

40. The method of claim 39, wherein the downstream receive readiness signal is indicative of readiness of the downstream logic component to receive data in the current or the next clock cycle; and further comprising:

determining in the current clock cycle readiness to receive data in the next clock cycle based on the downstream receive readiness signal; and changing the upstream receive readiness signal in the current clock cycle if, based on the downstream receive readiness signal, readiness to receive data in the next clock cycle is determined.

41. The electronic component of claim 1, wherein the one or more functions comprises: normalizing the data, excluding at least some of the data outside of one or more margins, or performing color correction.

42. The method of claim 31, wherein the one or more functions comprises: normalizing the data, excluding at least some of the data outside of one or more margins, or performing color correction.

* * * * *